April 17, 1951          L. W. DIXON          2,549,066
TEST PHONOGRAPH RECORD
Filed June 19, 1946
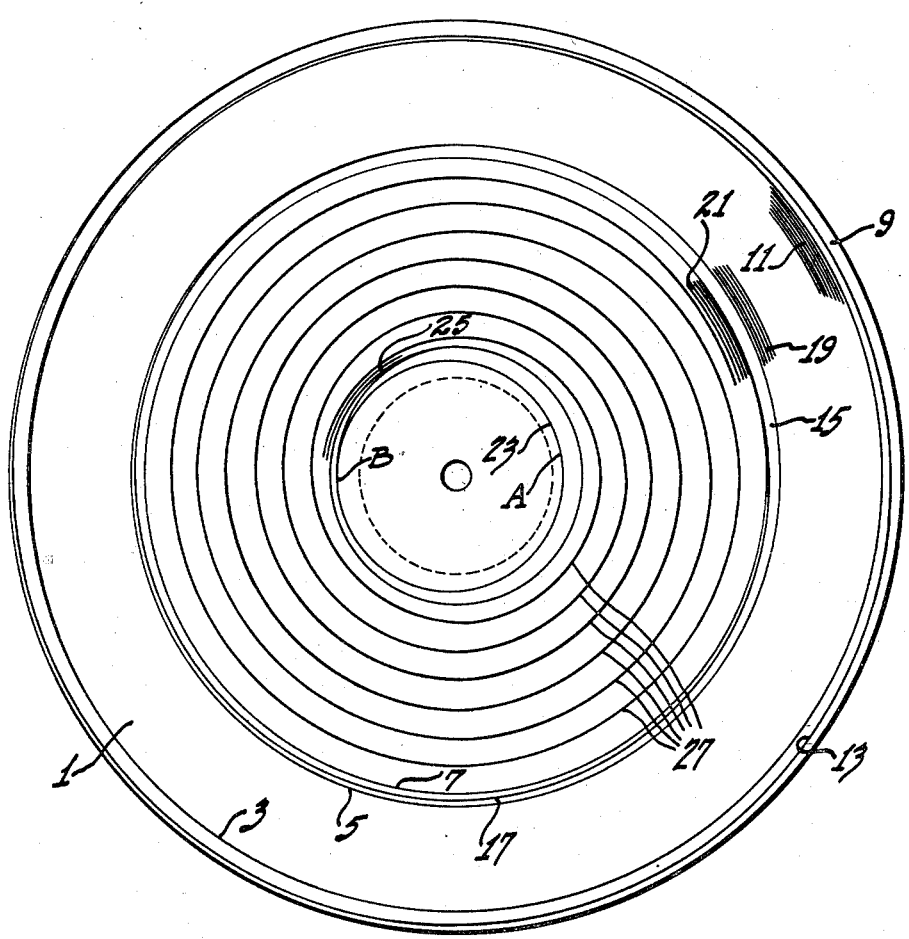
INVENTOR.
Lewis W. Dixon
BY
ATTORNEY

UNITED STATES PATENT OFFICE 2,549,066

TEST PHONOGRAPH RECORD

Lewis W. Dixon, Riverton, N. J., assignor to Radio Corporation of America, a corporation of Delaware Application June 19, 1946, Serial No. 677,769

3 Claims. (Cl. 274—42)

This invention relates to phonograph records, and more particularly to a test record for checking the operation of automatic phonographs.

In automatic record changing phonographs, the mechanism is arranged to go through a cycle of operations including the playing of a record on the turntable or other record support, removal of the needle or other scanning element from the record at the end of playing, transference of a new record to the turntable (unless the same record is to be repeated), and replacement of the needle or scanning element on either the new record or the previously played record for reproduction thereof. It is apparent that, in automatic phonographs of this type, it is important that the needle shall land at the proper point on each record and that the cycle initiating mechanism shall not be brought into operation until the records have been completely played if full reproduction of each record is to be realized. To this end, automatic phonographs of the type under consideration are given a number of careful checks in the course of manufacture to insure proper setting of the various parts or mechanisms thereof. The customary practice is to employ various gauges and the like for testing the mechanisms. Such testing devices are not only expensive, but are generally fairly time consuming and usually must be operated by skilled personnel.

The primary object of my present invention is to provide a novel test record for automatic record changer phonographs which will dispense with the gauges and similar devices used heretofore for checking the operation of such phonographs.

More particularly, it is an object of my invention to provide a novel test record which will afford a fast, accurate and convenient method of checking the mechanical operation of automatic record changer phonographs which employ records of standard dimensions.

Another object of my present invention is to provide an improved test record as aforesaid which can be used even by unskilled personnel to properly and accurately check automatic record changer phonographs.

It is also an object of my present invention to provide a novel test record as above set forth which can be readily manufactured and which is inexpensive in cost.

In accordance with one form of my present invention, I employ a disc record having a pair of blank portions constituting suitable landing areas for the needle in accordance with the desired operation of an automatic phonograph, one for 10 inch records and one for 12 inch records, with contiguous signal modulated grooves in each case which will provide an audible indication if the needle lands outside of the blank landing areas. The record is also provided with a suitable terminal groove in the central region of the disc for operating trip mechanisms of either the inertia type, the universal type, or the common diameter type. A signal modulated groove immediately in advance of the terminal groove serves to provide an audible indication if the trip mechanism is operated to initiate the cycle at too early a time. The various grooves on my improved test record are so arranged as to represent the critical dimensions governing the operation of automatic record changer phonographs. Thus, the landing and trip settings of the tone arm or pickup arm can be determined by merely placing upon the turntable of the phonograph which is to be checked or tested one of my novel test records, setting the mechanism in operation, and permitting the mechanism to go through one or more complete cycles.

The novel features of my invention, as well as additional objects and advantages thereof, will better be understood from the following description of one embodiment thereof, when read in connection with the accompanying drawing in which the single figure is a plan view of a disc record formed according to my present invention.

Referring more particularly to the drawing, there is shown a circular disc 1 formed of any material suitable for phonograph records and provided with a plurality of concentric, silent grooves 3, 5 and 7. The disc 1 preferably has a diameter of the order of $11\frac{23}{32}$ inches so as to be suitable for so called "12 inch" standard records. The groove 3, which may be a spiral groove, is formed on an average diameter of the order of $11^{33}/_{64}$ inches, this being the diameter at which the first turn of a music or other sound groove starts on standard 12 inch records, corresponding substantially to the outermost radial excursion of the phonograph needle during proper operation of the phonograph. There is thus provided a blank, unmodulated marginal portion 9 which has a width radially of the disc 1 of the order of $21/_{64}$ inch and which constitutes a safe landing area for the needle of a phonograph to be tested. Radially inwardly from and immediately following the groove 3 so as to be contiguous to the landing area 9 there are provided approximately ten turns of a signal modulated spiral groove 11 of any preferred pitch (for example, 88, 96, 104 or 112 grooves per inch in accordance with standard practice). The grooves 11 may be modulated at any suitable frequency (for example, 400 cycles per second) and serves as a warning signal to indicate that the phonograph being tested does not operate properly if, in the course of the automatic cycle, the needle lands thereon instead of landing on the blank area 9. Should the needle land in the groove 11, there will immediately result an audible signal indicating that the landing mechanism is improperly set. On the other hand, if the needle lands on the blank, silent portion 9, no signal will be heard and the checker will know at once that the needle landing mechanism is properly set. If desired, a spiral groove 13 may be provided to lead the needle into the spiral groove 3 after the needle lands on the safe, marginal area 9.

The groove 5 is formed on an average diameter of the order of $9\frac{33}{32}$ inches, and the groove 7 is formed on an average diameter of the order of $9^{33}/_{64}$ inches, which is the diameter at which the first turn of the music or sound groove starts on so called "10 inch" standard records. There is thus provided a blank portion 15 which, like the portion 9, has a width radially of the disc 1 of the order of $^{21}/_{64}$ inch, and which constitutes a safe landing area for the needle on a 10 inch record. Here, again, if desired, a spiral groove 17 may be provided to connect the silent grooves 5 and 7. Contiguous to the blank area 15, there are two sets of signal modulated, spiral grooves 19 and 21. Each of the grooves 19 and 21 may have from four to six turns, the groove 19 being disposed immediately in advance of the blank portion 15 and the groove 21 immediately beyond the portion 15. Thus, in an automatic record changer phonograph adjusted to play 10 inch standard records, if the needle lands on the blank area 15, it can be immediately ascertained that the landing mechanism is properly set. On the other hand, should the needle land in either one or the other of the grooves 19 and 21, an audible signal will result to indicate that the landing mechanism is improperly set and that adjustment is necessary.

In the central region of the disc 1, there is provided a terminal groove 23 which is preferably a circular groove disposed eccentrically with respect to the center of the disc 1. The terminal groove 23 is useful to initiate the cycle of automatic operations which includes removal of the needle from the record 1 and subsequently returning the needle to the appropriate landing area 9 or 15. This cycle may be brought about by any suitable trip mechanism of which there are three types in general use, namely, the universal type, the inertia type, or the common diameter type. In the universal type, the mechanism is tripped by backward movement of the tone arm resulting from radial movement of the needle from the low point A to the high point B of the eccentric terminal groove 23; the inertia type is responsive to the inward radial movement of the tone arm across the record at a rate greater than the rate of movement provided by the pitch of the sound grooves; and the common diameter type is rendered operative when the needle has reached a predetermined radial position on the record. My improved record is suitable for use with automatic phonographs having any one of the aforesaid, well known trip mechanisms. To this end, I provide approximately two turns of a spiral music groove 25 immediately in advance of the terminal groove 23. The high point B of the eccentric terminal groove 23 is on a radius such that it will cause trip mechanisms of the common diameter type to function when the needle reaches the point B or between the points B and A. Hence, if a phonograph provided with a common diameter type trip mechanism trips while the needle is still in the signal modulated groove 25, the checker will know at once that the mechanism is improperly set and adjustment is necessary. However, if the checker first hears the signal provided by the groove 25 and thereafter the common diameter trip mechanism functions to initiate the automatic cycle, he will know that the mechanism is in proper adjustment.

The signal modulated or sound groove 21 is connected to the signal modulated groove 25 by means of a relatively coarse pitch spiral groove 27 of several turns formed on the same pitch as the pitch of the eccentric groove 23 with respect to the center of the disc 1. Thus, in an automatic phonograph having an inertia type trip mechanism, when the needle leaves the music groove 21 and passes from one turn to the next adjacent turn of the groove 27, the mechanism will be tripped to initiate the automatic cycle. Of course, if desired, the music groove 21 may be connected to the music groove 25 by only a single or partial turn spiral groove where the record is to be used for checking phonographs provided with either the universal type trip mechanism or the common diameter type trip mechanism. In any case, it will undoubtedly be readily apparent to those skilled in the art that my improved record affords a simple, inexpensive and highly efficient means for and method of checking the landing and tripping mechanisms of automatic record changer phonographs.

Although I have shown and described but a single form of my invention, it will undoubtedly be apparent to those skilled in the art that various other forms thereof are possible. For example, this invention may be used with photographic disc records employing a light beam as the scanning element instead of the conventional needle. A test record according to my present invention may also be employed in phonographs utilizing cylindrical records, tape or strip records, or any other forms of records which are designed to operate trip mechanisms and with which a scanning element is to be brought into cooperative relation. I therefore desire that the form of my invention herein described and shown in the accompanying drawing shall be taken as illustrative and not as limiting.

I claim as my invention:

1. A phonograph record for checking the operation of phonographs which are provided with a turntable for supporting records having one or another of two different diameters and a needle for cooperation with records of either of said diameters supported on said turntable and which are operable through a cycle of automatic operations including removal of the needle from one record on the turntable and subsequent replacement thereof on either the same or another record on the turntable, said record comprising a disc having a diameter equal to substantially the larger of said two diameters and adapted to be supported on the turntable of a phonograph to be checked for rotation therewith, said disc having (1) a blank marginal portion spaced from the center of the disc a predetermined distance substantially equal to the outermost radial excursion of said needle during proper operation of said phonograph with records of said larger diameter, (2) a first signal modulated groove disposed radially inwardly from and contiguous to said blank portion, (3) a blank inner portion spaced from the center of the disc a second predetermined distance substantially equal to the outermost radial excursion of said needle during proper operation of said phonograph with records of the smaller of said two diameters, (4) second and third signal modulated grooves each of several turns contiguous to said blank inner portion, one radially outwardly of and the other radially inwardly of said blank inner portion, (5) a terminal groove arranged eccentrically in the central region of said disc for cooperation with the needle of said phonograph to initiate said cycle in accordance with proper operation of the phonograph, (6) a fourth signal modulated groove radially outwardly of said terminal groove, and (7) a groove connecting said third and fourth signal modulated grooves and comprising a spiral having a pitch of substantially the same order of magnitude as the eccentricity of said terminal groove, said record indicating (a) proper landing operation of said phonograph for records of said larger diameter only if said needle lands on said blank marginal portion in the course of said cycle and proper landing operation of said phonograph for records of said smaller diameter only if said needle lands on said blank inner portion in the course of said cycle, (b) improper landing operation of said phonograph if said needle lands on said first, second, or third signal modulated groove in the course of said cycle, and (c) proper cycle initiating operation of said phonograph only if said cycle is initiated following the warning signal provided by said fourth signal modulated groove.

2. A phonograph record according to claim 1 wherein each of said blank portions has a width radially of said disc of the order of $21/64$ inch.

3. A phonograph record according to claim 1 wherein said first signal modulated groove is a spiral of approximately ten turns, and wherein said second and third signal modulated grooves are spirals each of from four to six turns.

LEWIS W. DIXON.

REFERENCES CITED

The following references are of record in the file of this patent:

UNITED STATES PATENTS

| Number | Name | Date |
|---|---|---|
| 1,222,381 | Frankel | Apr. 10, 1917 |
| 1,280,384 | Brown | Oct. 1, 1918 |
| 1,867,997 | Baruch | July 19, 1932 |
| 1,943,460 | Stose | Jan. 16, 1934 |
| 1,952,054 | Black | Mar. 27, 1934 |
| 2,112,699 | Kleber | Mar. 29, 1938 |
| 2,262,732 | Gruber | Nov. 11, 1941 |
| 2,309,276 | Roberts | Jan. 26, 1943 |